Nov. 6, 1934.                F. R. SMITH                1,979,289
                INDICATOR FOR CHRONOMETERS AND THE LIKE
                       Original Filed Feb. 20, 1933
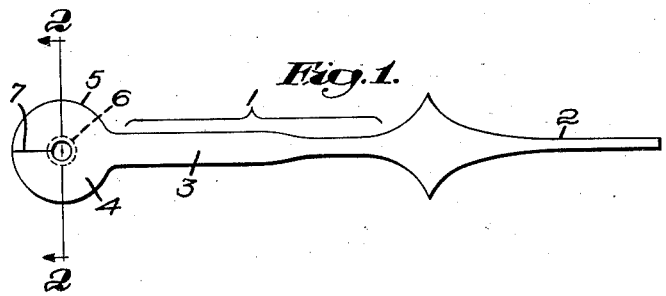
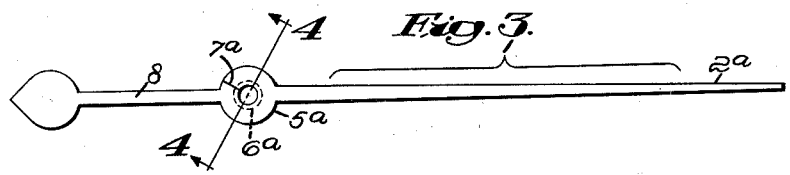
Inventor:
Francis R. Smith,
by Emery, Booth, Varney and Townsend
Attys Patented Nov. 6, 1934

1,979,289

UNITED STATES PATENT OFFICE 1,979,289

INDICATOR FOR CHRONOMETERS AND THE LIKE

Francis R. Smith, Wakefield, Mass.

Original application February 20, 1933, Serial No. 657,588. Divided and this application February 26, 1934, Serial No. 712,859

6 Claims. (Cl. 116—129)

My present invention relates to sheet metal articles provided with collared apertures, such, for example, as indicators or pointers and the like for chronometers, recorders and other mechanisms having movable indexes, pointers or "hands". The invention aims to provide inexpensive, efficient and otherwise improved articles of the class described. This application is a division of my copending application Serial No. 657,588, filed February 20, 1933, said application containing claims directed to the method or methods of my invention for producing the articles to which the claims of my present application are addressed.

In the drawing, illustrating by way of example certain embodiments of the invention, Fig. 1 is a plan of an indicator, pointer or hand, embodying one form of my invention, the same being shown as of the unbalanced type;

Fig. 2 is an enlarged section on the line 2—2 of Fig. 1;

Fig. 3 is a plan of an indicator, pointer or hand of the balanced type, also embodying my invention; and Fig. 4 is an enlarged section on the line 4—4 of Fig. 3.

Referring first to Figs. 1 and 2, the indicator there shown, represented as a whole by the numeral 1, includes a pointer or hand portion herein comprising a head or indicating end 2 and a shank 3, and includes a hub 4. Devices of this class are of two main types, considered with reference to their manner of mounting on a spindle arbor or shaft, namely, those having a non-circular hub aperture for reception on a like shaped rotating support, and those having a circular hub aperture, for frictional mounting on their correspondingly shaped arbor or other supporting member. My invention is concerned primarily with indicators of the second type, that is, for frictional mounting.

Heretofore indicators of this frictional mounting type have either had continuous non-slotted hubs, or have been provided with radial slots or cut out formations in their hubs, to afford a clamping or frictional gripping action upon the shaft or arbor. Such radial slot has been made by sawing, cutting or otherwise removing a portion metal, leaving a distinct gap in both the flange and the collar portions of the hub, which is objectionable for various reasons and detracts from the appearance of the indicator. The non-slotted indicators, with circular hub apertures, have lacked the desired clamping capacity.

In the indicators of my invention, the flange and collar of the indicator hub are expansible, for the desired clamping action, but have little or no metal removed, the separated portions being left in abutting or substantially abutting relation, so that the line of separation is scarcely visible or may be seen only with difficulty.

In Figs. 1 and 2 the hub flange is indicated at 5 and the collar or draw at 6. The radial line of interruption or separation of these parts is indicated by the line at 7, which line, due to the necessities of illustration, is rather more pronounced or somewhat exaggerated as compared with the actual device, in which, as stated, it is, to all intents and purposes, substantially invisible. It will be noted that the separated portions of the flange 5 abut or substantially meet, at the upper surface of the flange, as viewed in Fig. 1, and that this substantial abutting or meeting of the parts, see Fig. 2, is complete through the entire height of the collar or draw 6, although the degree of approach of the parts in the collar, or at least in the lower portion thereof, is less important, and some minor separation is not objectionable and remains within the scope of my invention.

In Figs. 3 and 4, illustrating an indicator of the balanced type, the parts corresponding to those of Figs. 1 and 2 are similarly numbered, with the addition of the reference character $a$. The balancing portion or extension of the indicator is seen at 8. With either the unbalanced or balanced type of indicator it will be apparent from Figs. 1 and 2 and Figs. 3 and 4 that in accordance with my invention the indicators comprise an expansible or clamping hub which is nevertheless closed or substantially so.

In the formation of an indicator of the balanced type the slit or break line in the flange and collar of the hub is more conveniently disposed at an angle to the axis of the shank, but in other respects the construction may be substantially as previously described in connection with Figs. 1 and 2.

As previously noted, claims directed to the methods of my invention, as above described in connection with the description of the articles, are included in my said copending application Serial No. 657,588.

My invention is not limited to the particular embodiments thereof illustrated and described herein, its scope being set forth in the following claims:

1. An indicator or hand adapted for mounting and frictional retention upon an arbor of a chronometer, recorder or the like, said indicator comprising an integral one-piece sheet metal device including a hub portion and a pointer portion projecting from the latter, said hub portion having a flange and an integral draw collar, said flange and collar surrounding and defining an arbor aperture and having through them a slit-like separating formation extending from the periphery of the flange and into said aperture and wherein the opposed metal edges are substantially in closed, contacting and mating relation upon completion of said formation and said indicator.

2. An indicator or hand in accordance with claim 1, wherein the indicator is of the unbalanced type.

3. An indicator or hand in accordance with claim 1, wherein the indicator is of the balanced type, having a balancing portion projecting from the hub portion in opposition to the pointer portion.

4. A sheet metal indicator or hand for chronometers, recorders and the like devices having pointer means, said indicator comprising a one-piece metallic member symmetrical in transverse cross-section at any point longitudinally thereof and including a hub portion and a pointer portion projecting from the latter, said hub portion comprising a centrally apertured flange merging at one portion of its periphery with the adjoining end of said pointer portion and an integral draw collar concentric with said aperture and forming with the latter a tubular formation internally conformable to an arbor on which the indicator is thereby adapted to be mounted in friction-clamping relation, and said flange and said collar having a slit communicating between the outer edge of the flange and the internal aperture of said tubular formation, the opposite walls of said slit being substantially in contact on completion of the slit and of the indicator, said flange then retaining a cross-sectional symmetry and said tubular arbor-receiving formation then presenting a substantially continuous internal surface for surrounding engagement with an arbor.

5. An indicator or hand in accordance with claim 4, wherein the indicator is of the unbalanced type.

6. An indicator or hand in accordance with claim 4, wherein the indicator is of the balanced type, having a balancing portion projecting from the hub portion in opposition to the pointer portion.

FRANCIS R. SMITH.